US008230566B2

(12) United States Patent
Oguri

(10) Patent No.: US 8,230,566 B2
(45) Date of Patent: Jul. 31, 2012

(54) SLEEVE PULLER

(75) Inventor: Hideo Oguri, Nagoya (JP)

(73) Assignee: Kuritakoki Co., Ltd., Aichi (JP)

(*) Notice: Subject to any disclaimer, the term of this patent is extended or adjusted under 35 U.S.C. 154(b) by 463 days.

(21) Appl. No.: 12/483,612

(22) Filed: Jun. 12, 2009

(65) Prior Publication Data

US 2009/0313799 A1 Dec. 24, 2009

(30) Foreign Application Priority Data

Jun. 18, 2008 (JP) ................................. 2008-159708
Apr. 17, 2009 (JP) ................................. 2009-101351
May 25, 2009 (JP) ................................. 2009-125702

(51) Int. Cl.

| | |
|---|---|
| ***B23P 19/04*** | (2006.01) |
| ***B23P 6/00*** | (2006.01) |
| ***B23P 19/00*** | (2006.01) |
| ***B25B 27/14*** | (2006.01) |
| ***B25B 13/00*** | (2006.01) |
| ***B25B 21/00*** | (2006.01) |
| ***B29C 73/00*** | (2006.01) |
| ***B66F 3/08*** | (2006.01) |

(52) U.S. Cl. ........... 29/264; 29/240; 29/281; 29/402.01; 29/426.6; 81/52; 254/98

(58) Field of Classification Search .................... 29/264, 29/726, 240, 281, 282, 402.01, 402.03, 402.11, 29/402.19, 426.1, 426.4, 426.5, 426.6; 259/98; 81/52, 53.2
See application file for complete search history.

(56) References Cited

U.S. PATENT DOCUMENTS 1,623,440 A * 4/1927 Ray ................................ 29/264
2,391,624 A * 12/1945 Heuer ............................ 81/53.2
3,120,700 A * 2/1964 Chuplis, Jr. ..................... 29/726
4,259,774 A * 4/1981 Dolinski et al. ................ 29/263
4,402,203 A * 9/1983 Molina ........................... 72/114
4,507,837 A * 4/1985 Hinkle ............................ 29/262
4,724,608 A * 2/1988 Parrott ............................ 29/724

(Continued)

FOREIGN PATENT DOCUMENTS

JP 55-32511 8/1980

(Continued)

OTHER PUBLICATIONS

English language Abstract of JP 8-118252, May 14, 1996.

(Continued)

*Primary Examiner* — Lee D Wilson
*Assistant Examiner* — Alvin Grant
(74) *Attorney, Agent, or Firm* — Greenblum & Bernstein P.L.C.

(57) ABSTRACT a sleeve puller for pulling out a sleeve inserted in a panel, the sleeve having an inner wall that defines a hole, the sleeve puller including: a sleeve-engaging rod having a distal end and integrally including a sleeve-engaging portion, a screw rod continuous with the sleeve-engaging portion, and a wrenching portion continuous with the screw rod and opposite from the sleeve-engaging portion across the screw rod, the sleeve-engaging portion having a screw thread therein and having a tapered shape having a diameter smaller toward the distal end of the sleeve-engaging rod; a nut support including a slidable surface, a nut supporting surface opposite from the slidable surface, and a through hole extending throughout the nut support from the slidable surface to the nut supporting surface so as to allow the screw rod of the sleeve-engaging rod to be inserted therethrough; and a nut.

5 Claims, 12 Drawing Sheets

U.S. PATENT DOCUMENTS

| | | | | | |
|---|---|---|---|---|---|
| 4,929,111 | A * | 5/1990 | Lauritano | ........................ | 403/16 |
| 5,156,755 | A * | 10/1992 | Cass | ............................. | 249/177 |
| 5,374,136 | A * | 12/1994 | LaPlante | ....................... | 403/370 |
| 5,519,929 | A * | 5/1996 | Bleckman | ....................... | 29/264 |
| 5,669,404 | A * | 9/1997 | Guillermo | ................ | 137/315.12 |
| 6,929,024 | B1 * | 8/2005 | Rucker | .................... | 137/315.41 |
| 7,120,981 | B2 * | 10/2006 | Huang | ............................ | 29/264 |
| 7,887,274 | B2 * | 2/2011 | Catlin | ........................... | 411/427 |
| 7,987,571 | B2 * | 8/2011 | English | ........................... | 29/264 |
| 7,987,572 | B2 * | 8/2011 | Badman et al. | ............ | 29/402.03 |
| 2010/0095500 | A1 * | 4/2010 | Whitaker | ........................ | 29/264 |

FOREIGN PATENT DOCUMENTS

| | | |
|---|---|---|
| JP | 56-10537 | 3/1981 |
| JP | 63-83281 | 6/1988 |
| JP | 3-103170 | 10/1991 |
| JP | 3016627 | 7/1995 |
| JP | 8-118252 | 5/1996 |
| JP | 11-129165 | 5/1999 |
| JP | 2001-21072 | 1/2001 |
| JP | 2007-44766 | 2/2007 |

OTHER PUBLICATIONS

English language Abstract of JP 2007-44766, Feb. 22, 2007.

English language Abstract of JP 11-129165, May 18, 1999.

English language Abstract of JP 2001-21072, Jan. 26, 2001.

* cited by examiner

SLEEVE PULLER

CROSS REFERENCE TO RELATED APPLICATION

This application claims priority from Japanese Patent Application No. 2008-159708 filed on Jun. 18, 2008, Application No. 2009-101351 filed on Apr. 17, 2009, and Application No. 2009-125702 filed on May 25, 2009. The entire content of these priority applications is incorporated herein by reference.

TECHNICAL FIELD

The present invention relates to a sleeve puller for pulling out a metal sleeve inserted in a carbon-fiber reinforced plastic panel.

BACKGROUND

In recent years, a structural material of, for example, aircrafts is shifting from aluminum alloy to carbon-fiber reinforced plastics (CFRP) for weight saving, and the CFRP composite material is beginning to be used also as the material of main wings of the aircrafts. Each of such main wings, which can load fuel therein, has an I-shaped reinforcing rib made of aluminum alloy and two CFRP plates arranged on the top and bottom of the reinforcing ribs. FIG. 11 shows an illustration of means for joining the I-shaped reinforcing rib and one of the CFRP composite plates. The means includes: boring a through hole 101 in a layer of a CFRP composite plate 102 and an aluminum alloy plate 103; spot facing the end of the through hole 101 into a tapered shape; fitting a stainless steel sleeve S in the through hole 101; and forcing a titanium fastener F as a fastening member into the through hole 101. A liquid-tight structure of the main wing can thus be achieved.

However, the sleeve used in the main wing of the aircraft has a thickness of 0.1 to 0.2 mm, i.e. is very thin. Therefore, when the fastener is forced into the through hole, and the sleeve is forced against the inner wall of the through hole, the sleeve can crack and fracture in the middle portion thereof and come out of the surface opposite from the surface wherefrom the fastener is inserted. Furthermore, in some cases where spot facing in the end of the through hole is insufficient, the sleeve cannot completely fit in the through hole and extends beyond the outer surface of the CFRP plate. In these cases, the operator has to pull the fastener and the sleeve out of the through hole so as to replace them with new ones and/or to execute spot-facing work in the end of the through hole over again.

A puller for pulling out the sleeve out of the through hole in these cases is disclosed in, for example, Japanese Examined Patent Application Publication No. 55-32511. This art, as illustrated in FIG. 12, is used in a manner as follows: mate an in-low 4*c* of a screw rod guide 4 with an in-low portion 1*b* of a housing 1; clockwisely rotate a grip 8 so that a screw tap 3*a* of a screw rod 3 taps the inner surface of a blank cap 2; and, after finishing the tapping, clockwisely rotate a handle lever 6 to pull up the screw rod 3 and thereby detach the blind cap 2 from the housing 1.

In a case where a space for setting the puller and performing the pulling work is sufficiently large, the puller as described above is useful. However, in a case where the space for setting the puller and performing the pulling work is small, the puller is difficult to use. Moreover, depending on the location of the through hole, it is impossible to use the puller. Furthermore, while a comparatively big and thick member is easy to pull out using the puller, a very small and thin member (such as the member as above that is used in the main wing of the aircraft) is uneasy to pull out using the puller: during pull-out work, the sleeve can be fractured, and/or the inner wall of the hole can be damaged. This is a problem, and the puller is utterly unsuited to practical use due to the problem.

Thus, there is a need in the art for a puller that can be used for pulling out the metal sleeve inserted in the CFRP panel and, furthermore, is small-sized so as to be used in the small space.

SUMMARY

An aspect of the present invention is a sleeve puller for pulling out a sleeve inserted in a panel, the sleeve having an inner wall that defines a hole, the sleeve puller including: a sleeve-engaging rod having a distal end and integrally including a sleeve-engaging portion, a screw rod continuous with the sleeve-engaging portion, and a wrenching portion continuous with the screw rod and opposite from the sleeve-engaging portion across the screw rod, the sleeve-engaging portion having a screw thread therein and having a tapered shape having a diameter smaller toward the distal end of the sleeve-engaging rod; a nut support including a slidable surface, a nut supporting surface opposite from the slidable surface, and a through hole extending throughout the nut support from the slidable surface to the nut supporting surface so as to allow the screw rod of the sleeve-engaging rod to be inserted therethrough; and a nut. The sleeve-engaging portion is capable of being inserted in the hole of the sleeve so that the screw thread engages with the inner surface of the sleeve. The sleeve-engaging rod is capable of being rotated by wrenching the wrenching portion; and the nut is capable of being placed on the nut supporting surface of the nut support and is screwed onto the screw rod of the sleeve-engaging rod.

DETAILED DESCRIPTION

An embodiment in accordance with the present invention will be described with reference to FIGS. 1 through 6.

Figure 1:
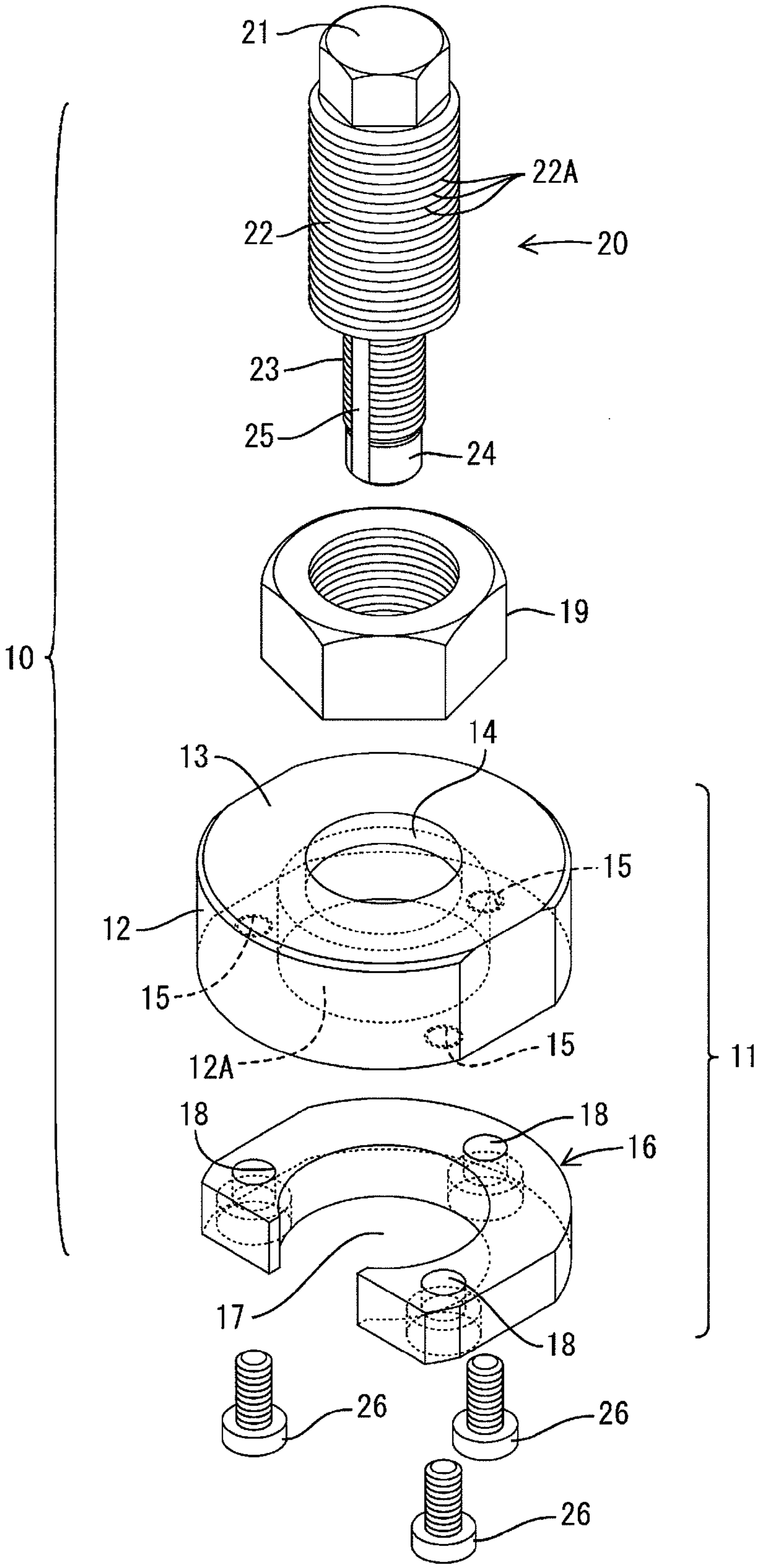
FIG. 1 is an exploded perspective view of a sleeve puller of an embodiment in accordance with the present invention.
Figure 2:
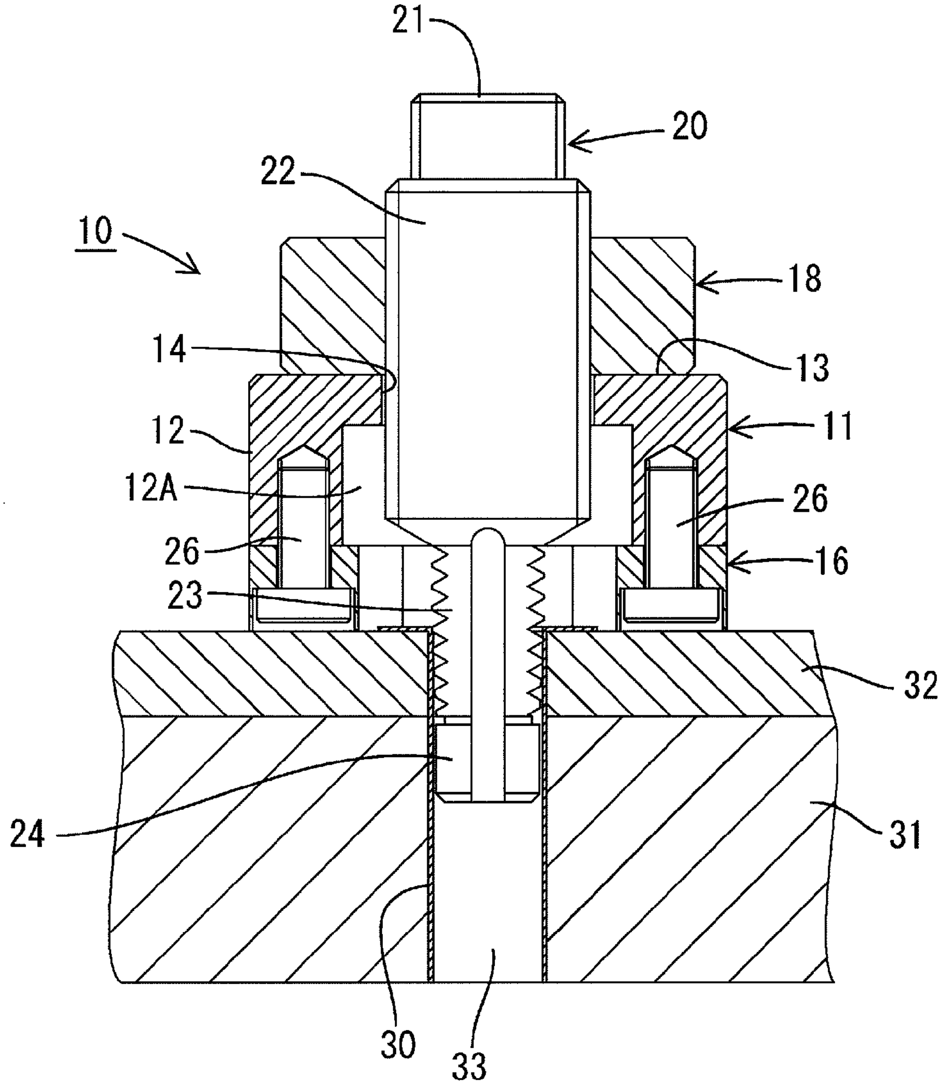
FIG. 2 is an axial cross-sectional view showing a state before a sleeve is pulled out.
Figure 3:
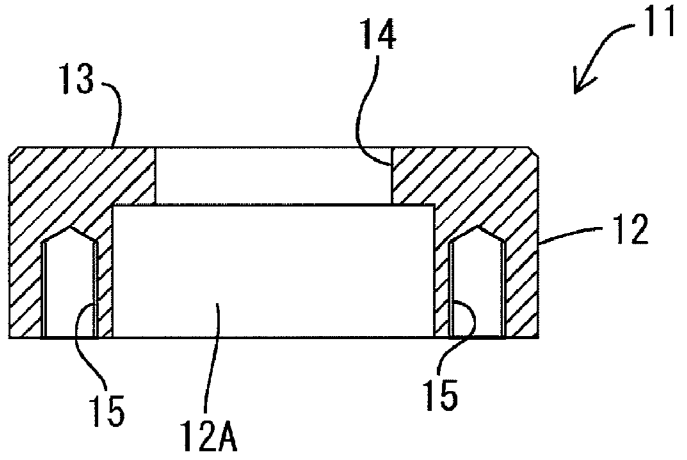
FIG. 3 is a longitudinal cross-sectional view of a tubular support member.
Figure 4:
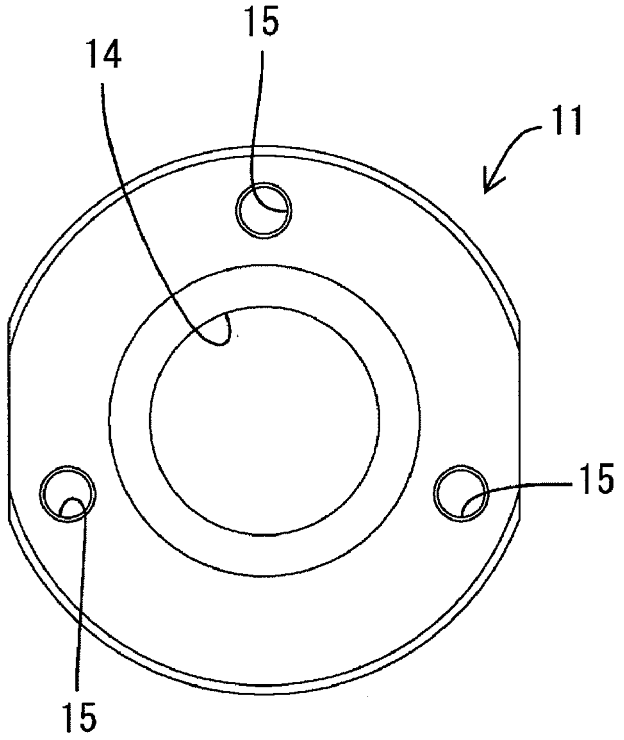
FIG. 4 is a bottom view of a tubular support member.
Figure 5:
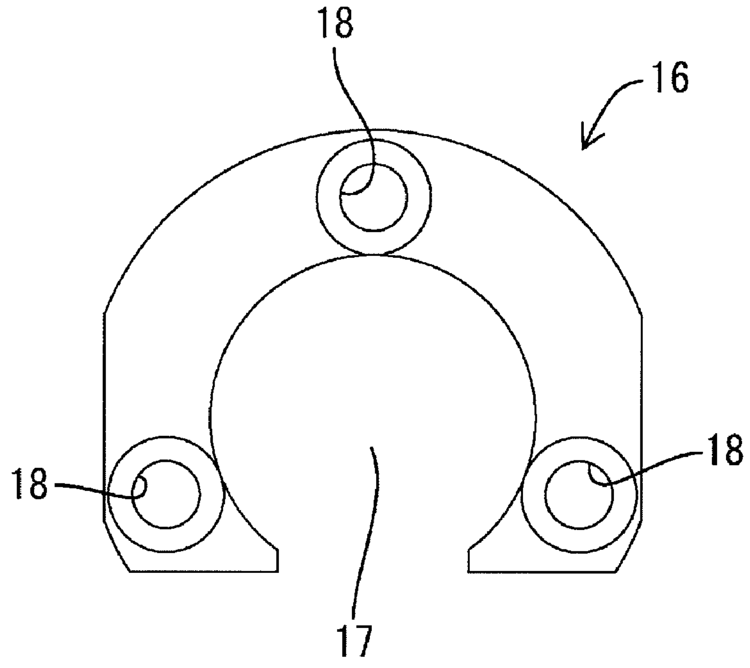
FIG. 5 is a bottom view of a slide plate.

A sleeve puller 10 of this embodiment is used for pulling out a metal sleeve 30 inserted in a panel that, for example, configures a main wing structure of an aircraft and is made of carbon fiber reinforcing plastic (CFRP). FIG. 1 shows an exploded perspective view of the sleeve puller 10. FIG. 2 shows an axial cross-sectional view of the sleeve puller 10. As shown in these figures, the sleeve puller 10 includes a nut support 11, a nut 19, and a sleeve-engaging rod 20.

The nut support 11 includes a tubular support member 12 and a slide plate 16 having a slidable surface. The tubular support member 12 is made of metal and has a substantially cylindrical shape having a circular through hole 12A. The slide plate 16 is made of fluorocarbon polymer and is attached to a bottom surface of the tubular support member 12.

A top surface (a surface opposite from the surface facing the slide plate 16) of the tubular support member 12 has a nut supporting surface 13. A through hole 14 is formed in the nut supporting surface 13. The through hole 14 has a diameter smaller than a diameter of the through hole 12A (see FIGS. 3 and 4). Three screw holes 15 are formed in the bottom surface of the tubular support member 12 at substantially equal angles around the through hole 12A.

An opening 17 is formed in the slide plate 16. The opening 17 has a diameter substantially the same with the diameter of the through hole 12A of the tubular support member 12. Three stepped bolt insertion holes 18 are formed in the slide plate 16 at substantially equal angles around the opening 17. Attachment bolts 26 are inserted in the bolt insertion holes 18 and are screwed up into the screw holes 15 of the tubular support member 12. The slide plate is thus fixed to the tubular support member 12. The slide plate 16 has a shape generally similar to the tubular support member 12 while partly straightly cut away in an angular area narrower than a semicircle so that the opening 17 is laterally open. The slide plate 16 as a whole thus has a substantial U-shape (see FIG. 5).

Figure 6:
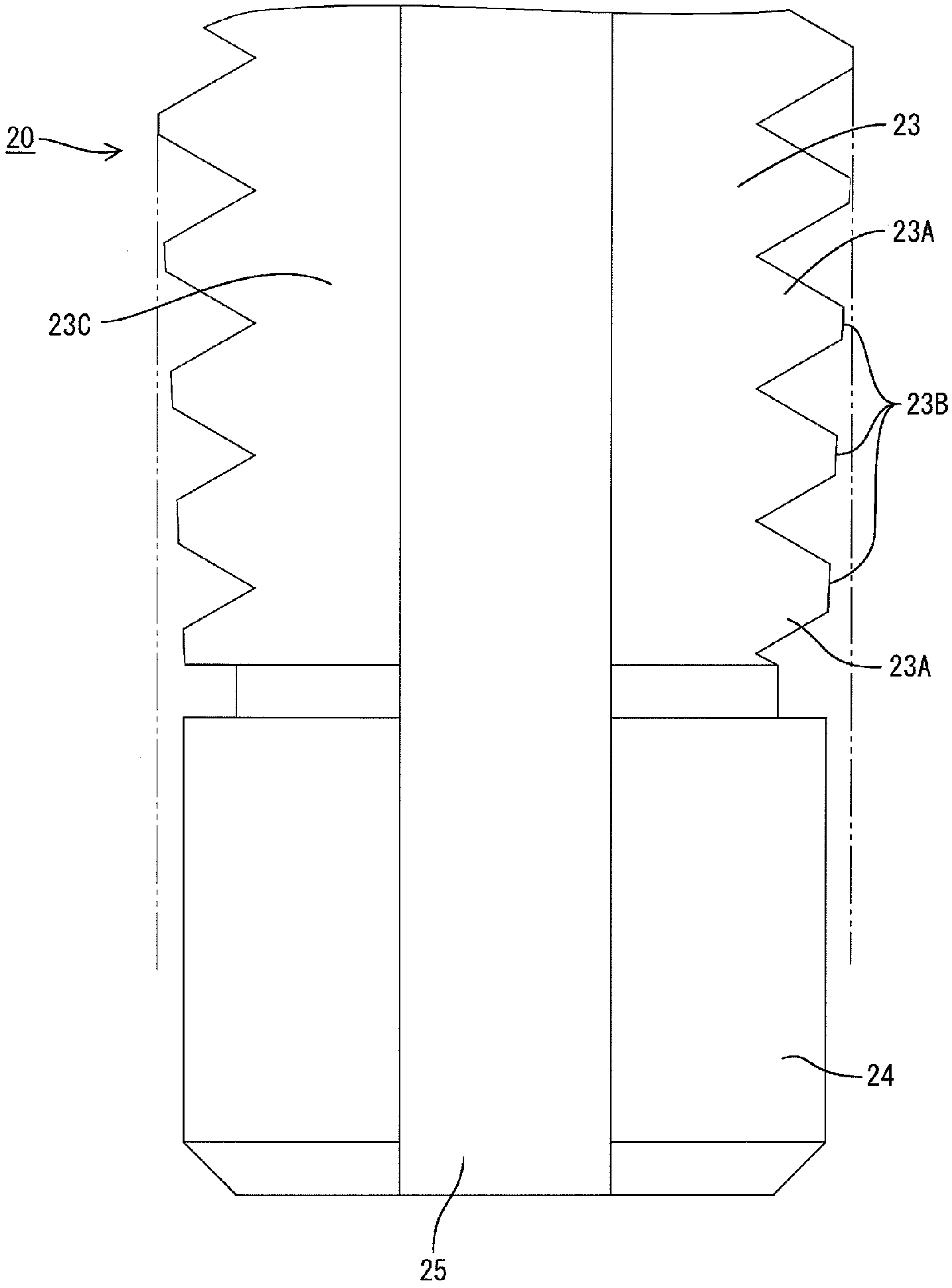
FIG. 6 is a fragmentary enlarged view of a sleeve-engaging portion.

On the other hand, as illustrated in FIG. 1, the sleeve-engaging rod 20 includes a wrenching portion 21, a screw rod 22, a sleeve-engaging portion 23, and an insertion guide shaft 24 that are integrally formed in that order from one of ends of the sleeve-engaging rod 20. The wrenching portion 21 has a hexagonal column shape. The screw rod 22 is continuous with the wrenching portion 21. The screw rod 22 has a diameter larger than the diameter of the wrenching portion 21. A helical screw thread 22A is formed around an outer surface of the screw rod 22. The sleeve-engaging portion 23 is continuous with the screw rod 22 and has a diameter smaller than the screw rod 22. As illustrated in FIG. 6, the sleeve-engaging portion 23 includes a shaft body 23C and a helical screw thread 23A. The shaft body 23C has a uniform diameter. The screw thread 23A is formed around an outer surface of the shaft body 23C. The crest of the screw thread 23A is obliquely cut away so that the sleeve-engaging portion 23 tapers off toward the distal end thereof (toward the insertion guide shaft 24). The screw thread 23A thus has a flat crest 23B. In addition, the insertion guide shaft 24 is disposed at the distal end side of the sleeve-engaging portion 23. The insertion guide shaft 24 has a diameter the same with the smallest diameter of the sleeve-engaging portion 23. The insertion guide shaft 24 has a smooth cylindrical surface. Furthermore, two relief grooves 25 continuously and axially extends at angles of 180 degrees in the outer cylindrical surfaces of the sleeve-engaging portion 23 and the insertion guide shaft 24. Each relief groove 25 is open at the distal end thereof.

The nut 19 can be screwed onto the screw rod 22. The outer diameter of the nut 19 is larger than the through hole 14 of the nut support 11 so as to be placed on the nut supporting surface 13.

Next, a method of using the sleeve puller 10 of this embodiment will be described.

As illustrated in FIG. 2, a panel 31 and a reinforcing member 32 are layered together, and a hole 33 is formed through the layered interface. The sleeve 30 is inserted in the hole 33. The sleeve 30 is pulled out in a manner as follows. First, the sleeve-engaging rod 20 is lightly put in the hole 33 of the sleeve 30 from the end of the insertion guide shaft 24. Then, because the insertion guide shaft 24 has a diameter smaller than the diameter of the sleeve 30, the entire sleeve-engaging rod 20 is guided to a normal insertion position relative to the sleeve 30.

Next, the wrenching portion 21 is slowly rotated using, for example, a ratchet wrench. Then, the sleeve-engaging portion 23 is gradually and deeply inserted in the hole 33. Note here that the diameter of the sleeve-engaging portion 23 including the screw thread 23A decreases toward the distal end of the sleeve-engaging portion 23 (toward the insertion guide shaft 24). That is, the sleeve-engaging rod 20 including the screw thread 23A has the largest diameter at the basal end thereof. Therefore, as the sleeve-engaging portion 23 is inserted in the hole 33, the screw thread 23A sinks into the inner wall of the sleeve 30, so that the rolling resistance gradually increases. Note also that, because the crest of the screw thread 23A has the flat crest 23B, the screw thread 23A is prevented from excessively sinking into the inter wall of the sleeve. A helical edge of the flat crest 23B of the screw thread 23A thus engages with the inner wall of the sleeve 30. Thereafter, when the rolling resistance has increased to a desired level, screwing of the sleeve-engaging rod 20 is stopped.

Next, the wrenching portion 21 and the screw rod 22 of the sleeve-engaging rod 20 are inserted throughout the through hole 14 with the slide plate 16 of the nut support 11 faced toward the reinforcing member 32. The nut support 11 is thus placed on the reinforcing member 32.

At this time, the nut supporting surface 13 should be held at a distance from the reinforcing member 32 so that the screw rod 22 of the sleeve engaging rod 20 is at least partly positioned under the nut supporting surface 13 of the nut support 11 (nearer to the reinforcing member 32 than the nut supporting surface 13). Note that the sleeve puller 10 of the present embodiment has the slide plate 16 to be placed on the surface of the reinforcing member, damage to the surface of the reinforcing member 32 by the nut support 11 can be prevented.

Figure 7:
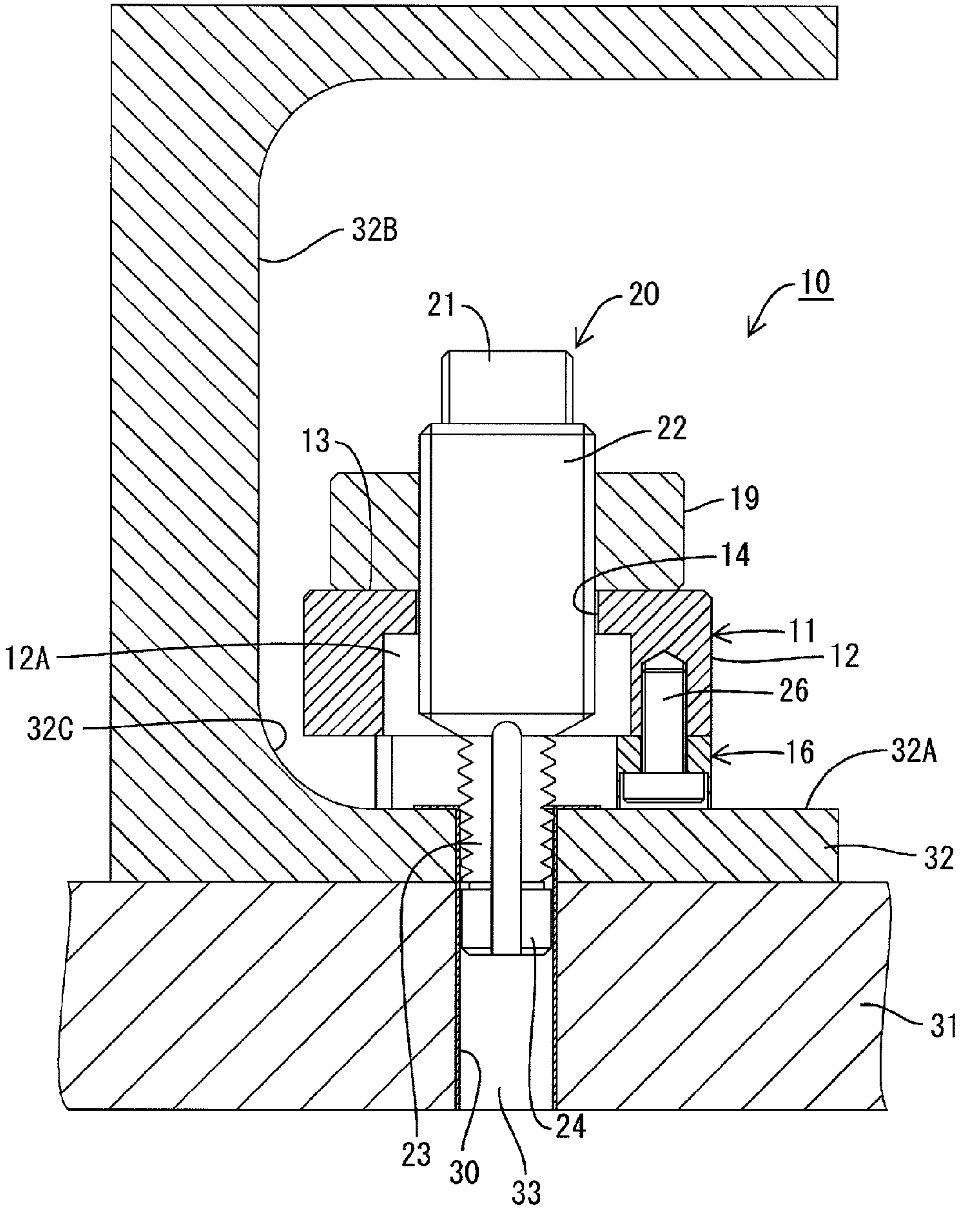
FIG. 7 is a cross-sectional view of the state before the sleeve is pulled out as viewed from a direction different from FIG. 2.

Suppose here a case as illustrated in FIG. 7, where the reinforcing member 32 has a radius 32C between a horizontal portion 32A and a standing portion 32B, and the sleeve 30 is inserted near the radius 32C. Even in this case, because the slide plate 16 has the partly and straightly cut-away shape, the cut-away portion releases the radius 32C of the reinforcing member 32. Thus, the nut support 11 can be placed without inclining.

Finally, while rotation of the sleeve-engaging rod 20 (the wrenching portion 21) is restricted, the nut 19 is screwed onto the screw rod 22 of the sleeve-engaging rod 20 until the nut 19 contacts the nut supporting surface 13 of the nut support 11. Furthermore, after the nut 19 contacts the nut supporting surface 13, the nut 19 is further and slowly screwed. Then, along with the rotation (screw) of the nut 19, the sleeve-engaging rod 20 moves in a direction to get out of the hole 33. Thus, the sleeve 30, which is caught around the sleeve-engaging portion 23, is pulled together with the sleeve-engaging rod 20 out of the hole 33.

Thus, using the sleeve puller 10 of this embodiment, the sleeve 30 can be pulled out easily and without damaging the sleeve 30 and/or the inner wall of the hole 33.

Other Embodiments

The present invention is not limited to the embodiment described above with reference to the drawings. For example, the following embodiments are also within the scope of the present invention.

(1) In the above-described embodiment, the diameter of the insertion guide shaft 24 is the same with the smallest diameter of the sleeve-engaging portion 23. The diameter of the insertion guide shaft 24 may be smaller than the smallest diameter of the sleeve-engaging portion 23. Note that the insertion guide shaft may be omitted.

Figure 8:
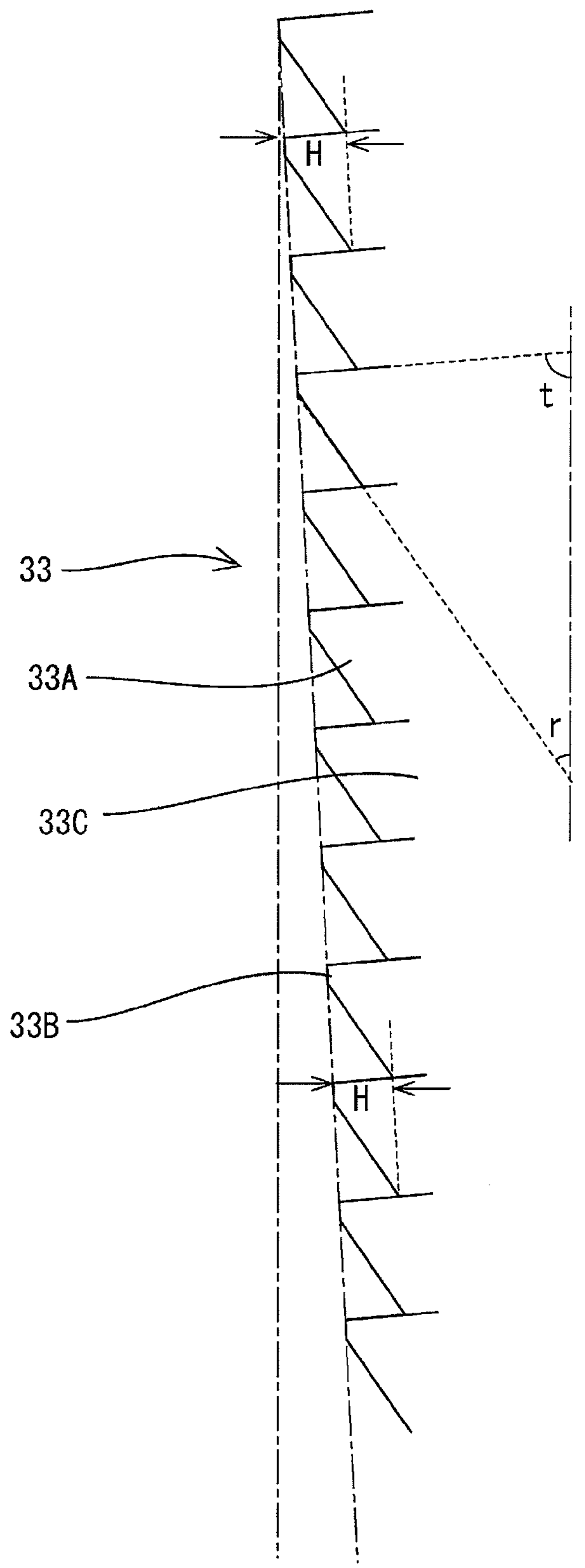
FIG. 8 is a fragmentary enlarged view of a sleeve-engaging portion of other embodiments.

(2) The sleeve-engaging rod 20 may include, instead of the sleeve-engaging portion 23, another type of a sleeve-engaging portion such as a sleeve-engaging portion 33 having a shaft body 33C and a screw thread 33A, as illustrated in FIG. 8. The shaft body 33C tapers off toward the distal end thereof, while a screw thread 33A has a uniform height H around the outer surface of the shaft body 33C. Essentially, it is only necessary for the sleeve-engaging portion (as a whole, i.e. including the screw thread) to have the tapering off shape.

(3) As shown likewise in FIG. 8, the screw thread has a surface facing the distal end of the shaft body and a surface facing the basal end of the shaft body. An angle made by the surface facing the distal end side of the shaft body and the axis of the shaft body may be smaller than an angle made by the surface facing the basal end side of the shaft body and the axis of the shaft body. This configuration functions as follows: at the time of inserting the sleeve-engaging rod into the sleeve, the screw thread gently contacts the sleeve, so that the sleeve is not damaged; on the other hand, at the time of pulling out the sleeve-engaging rod and the sleeve, because the upper slope is set so as to have a larger contact angle to the sleeve, the sleeve can be held without slipping from the screw thread. Thus, the sleeve can be stably caught and pulled out.

(4) In the above embodiment, the sleeve puller 10 is used illustratively for pulling out the cylindrical and T-shaped sleeve 30 having a flange at one of the ends thereof. The sleeve puller 10 may be used for pulling out a Y-shaped sleeve which end is embedded in the spot-faced hole.

Figure 9:
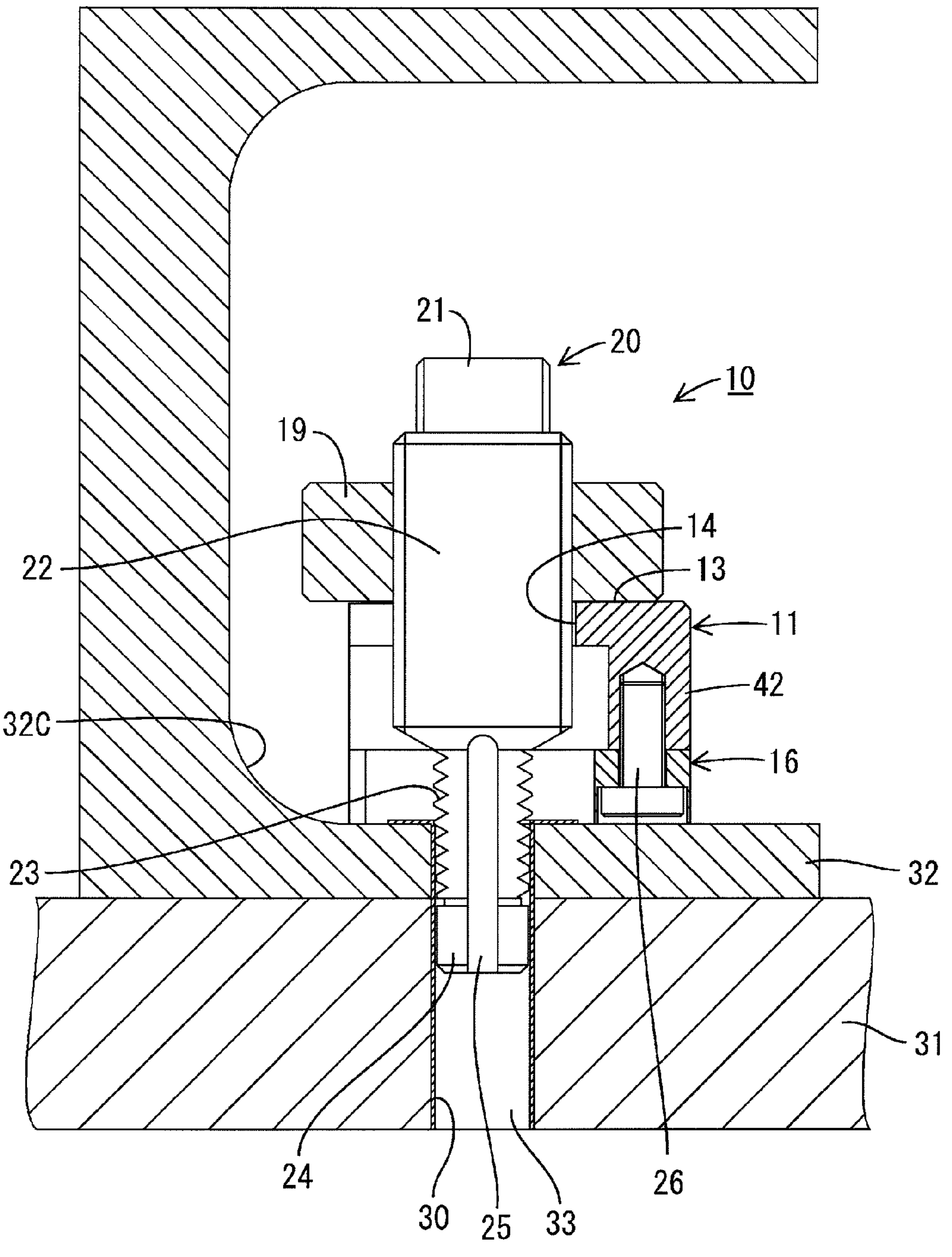
FIG. 9 is a longitudinal cross-sectional view of a sleeve puller of another embodiment.
Figure 10:
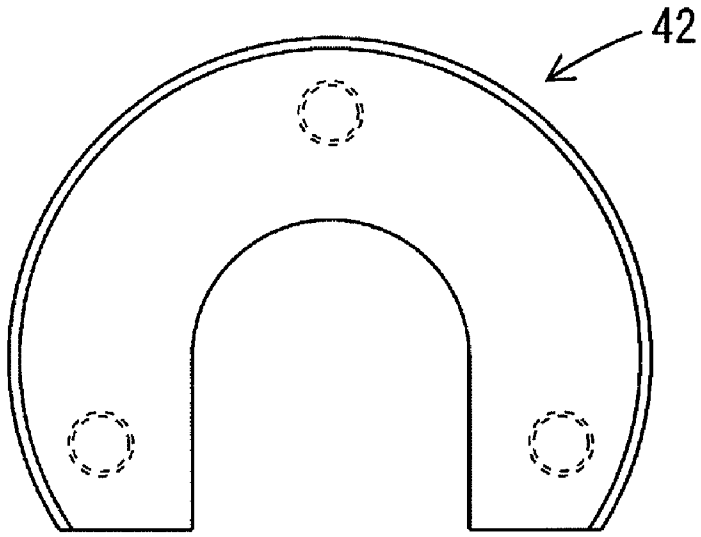
FIG. 10 is a plan view of a tubular support member of another embodiment.
Figure 11:
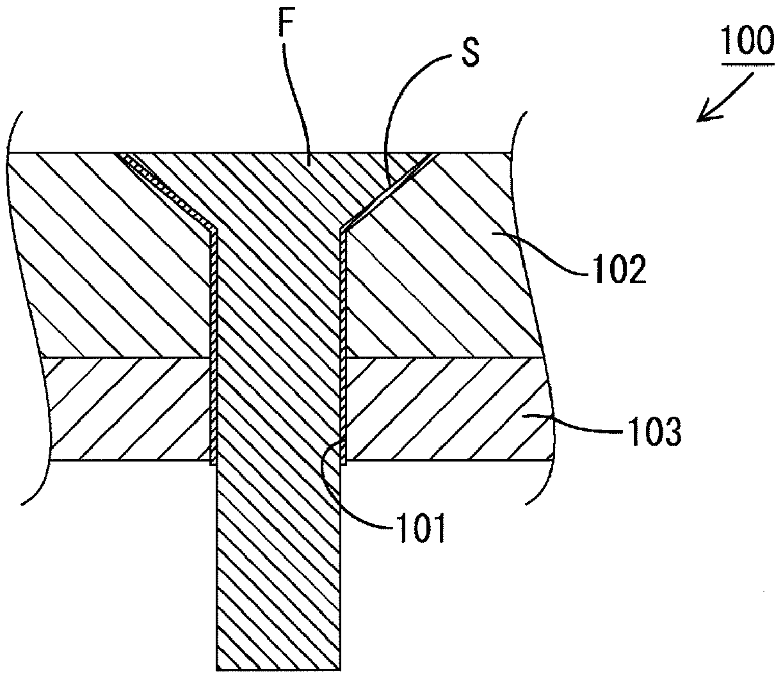
FIG. 11 is an enlarged cross-sectional view showing a part of a main flag of an aircraft, where a CFRP plate and an aluminum alloy plate are layered and joined.
Figure 12:
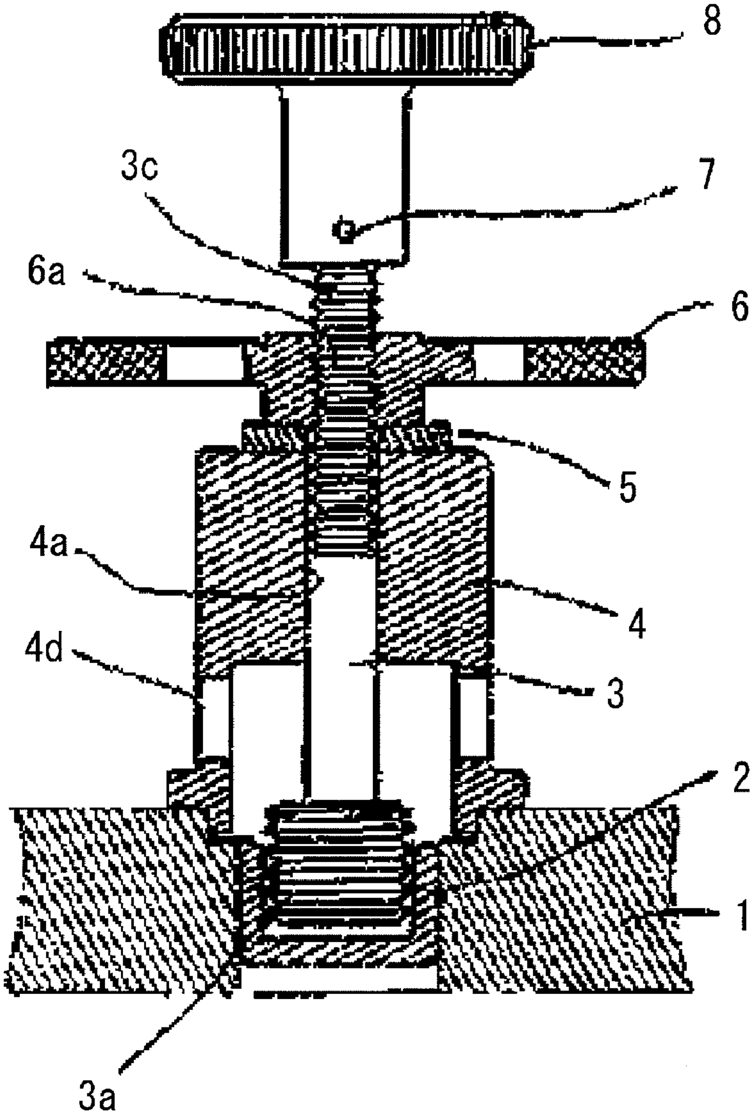
FIG.12 Prior Art
FIG. 12 is a cross-sectional view showing a typical type of sleeve puller.

(5) In the above embodiment, the slide plate 16 illustratively has the shape cut-away in the angular area narrower than the semicircle. In addition to this, as illustrated in FIGS. 9 and 10, a tubular support member 42 may also have a shape cut-away in an angular area similar to that of the slide plate 16. Note that the cutting-away may be omitted; the slide plate (and the tubular support member) may have an uncut shape.

What is claimed is:

1. A sleeve puller for pulling out a sleeve inserted in a panel, the sleeve having an inner wall that defines a hole, the sleeve puller comprising:

a sleeve-engaging rod having a distal end and integrally including a sleeve-engaging portion, a screw rod continuous with the sleeve-engaging portion, and a wrenching porting continuous with the screw rod and opposite from the sleeve-engaging portion across the screw rod, the sleeve-engaging portion having a screw thread therein and having a tapered shape having a diameter smaller toward the distal end of the sleeve-engaging rod;

a nut support including a slidable surface, a nut supporting surface opposite from the slidable surface, and a through hold extending throughout the nut support from the slidable surface to the nut supporting surface so as to allow the screw rod of the sleeve-engaging rod to be inserted therethrough; and a nut;

wherein:

the sleeve-engaging portion is capable of being inserted in the hole of the sleeve so that the screw thread engages with the inner surface of the sleeve;

the sleeve-engaging rod is capable of being rotated by wrenching the wrenching portion;

the nut is capable of being placed on the nut supporting surface of the nut support and is screwed onto the screw rod of the sleeve-engaging rod;

the nut support includes a metal tubular support member and a slide plate, the tubular support member having the nut supporting surface and an end surface whereto the tubular support member is attached;

the slide plate has the slidable surface; and the slide plate has a shape straightly cut away in an angular area narrower than a semicircle.

2. The sleeve puller according to claim 1, wherein:

the tubular support member has a shape straightly cut away in an angular area substantially equal to the angular area of the slide plate.

3. The sleeve puller according to claim 1, wherein:

the sleeve-engaging rod further includes an insertion guide shaft disposed at the distal end of the sleeve-engaging portion, the insertion guide shaft having a smooth cylindrical surface and a diameter equal to or smaller than a smallest diameter of the sleeve-engaging portion.

4. The sleeve puller according to claim 1, wherein:

the sleeve-engaging portion further includes a shaft body having an outer surface; and the screw thread has a uniform height and has a flat crest.

5. The sleeve puller according to claim 4, wherein:

the screw thread has a surface facing the distal end of the shaft body and a surface facing the basal end of the shaft body; and an angle made by the surface facing the distal end side of the shaft body and the axis of the shaft body is smaller than an angle made by the surface facing the basal end side of the shaft body and the axis of the shaft body.

* * * * *